(12) United States Patent
Evans et al.

(10) Patent No.: US 9,438,858 B1
(45) Date of Patent: Sep. 6, 2016

(54) TECHNIQUES FOR SHARING IMAGE DATA REMOTELY

(71) Applicant: Bandwidth.com, Inc., Raleigh, NC (US)

(72) Inventors: Courtney Evans, Apex, NC (US); Daniel Goslen, Raleigh, NC (US)

(73) Assignee: Bandwidth.com, Inc., Raleigh, NC (US)

( * ) Notice: Subject to any disclaimer, the term of this patent is extended or adjusted under 35 U.S.C. 154(b) by 0 days.

(21) Appl. No.: 14/825,200

(22) Filed: Aug. 13, 2015

(51) Int. Cl.
*H04N 7/14* (2006.01)
*H04N 7/15* (2006.01)

(52) U.S. Cl.
CPC ........................................ *H04N 7/15* (2013.01)

(58) Field of Classification Search
None
See application file for complete search history.

(56) References Cited

U.S. PATENT DOCUMENTS

| | | | | |
|---|---|---|---|---|
| 8,806,354 B1* | 8/2014 | Hyndman | ........... | G06F 3/04883 709/204 |
| 2005/0119779 A1* | 6/2005 | Amico | ................. | G06K 9/481 700/132 |
| 2012/0278735 A1* | 11/2012 | Singh | .................... | H04M 3/562 715/753 |
| 2014/0245185 A1* | 8/2014 | Knodt | ................. | H04L 65/1069 715/753 |
| 2015/0304588 A1* | 10/2015 | Jung | ................... | H04N 21/8153 348/552 |

* cited by examiner

*Primary Examiner* — Maria El-Zoobi
(74) *Attorney, Agent, or Firm* — Gregory Stephens

(57) ABSTRACT

Techniques are disclosed for sharing image data in a collaborative environment. In a network based server situated in an Internet Protocol (IP) based packet data network, a request may be received for a session ID from an image capture requesting device via a networked connection. The network based server may return a session ID to the image capture requesting device. The network based server may then receive image data indicative of a whiteboard and including marked corners. The image data may further comprise metadata including the session ID. The network based server may then process the received image, the processing including a rasterization process and a vectorization process. The network based server may then create a snapshot comprising the received image data, the rasterized image data, the vectorized image data, and the metadata. The network based server may then receive an access request for a snapshot associated with a session ID from a media consumption requesting device via a networked connection and provide access to the snapshot to the media consumption requesting device.

15 Claims, 6 Drawing Sheets

100

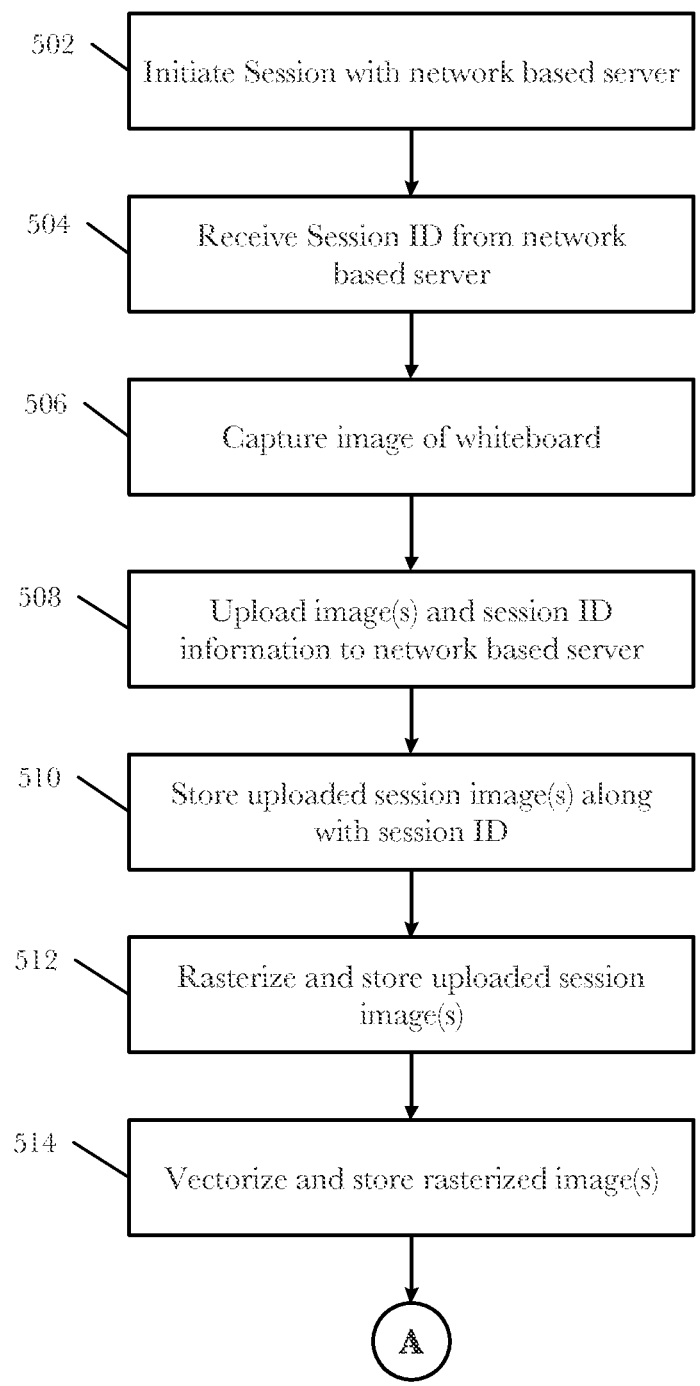

500

TECHNIQUES FOR SHARING IMAGE DATA REMOTELY

TECHNICAL FIELD

Examples described herein are generally related to techniques for remotely sharing images in near real-time as well as an archive service.

BACKGROUND

In many work environments collaboration is a key element. Often, however, collaborators are not all physically located in the same place at the same time. Many times telephone or video conference calls are held between or among multiple people in multiple places. In addition, the information shared may sometimes take the form of text, drawings, or other content spontaneously created during the meeting on, for instance, a whiteboard. For example, one person may take notes on a whiteboard type surface based on the conversation among the participants. If on a conference call, these notes may only be visible to those in the room where the whiteboard is located. For video conferences, the notes may not be visible unless the video camera is trained on the whiteboard itself rather than the participants as is customary. Even if most of the participants can see the whiteboard there is still the issue of memorializing the content generated during the conference. Once the conference is over and the room is vacated, the whiteboard may be erased by the next group to use the room.

There are specialized whiteboards that can be directly coupled with computer systems. Some specialized whiteboards may be able to track and transcribe writing and images made to the whiteboard via touch sensitive technologies and complex computer circuitry and programming. Such whiteboards are extremely costly as compared to ordinary whiteboards having no associated electronics.

What is needed is an inexpensive technique to capture, disseminate, and archive content such as text and images made to a whiteboard during a conference or collaborative type setting that spans multiple locations.

BRIEF DESCRIPTION OF THE DRAWINGS

FIG. 5A illustrates an example logic flow diagram according to an embodiment of the invention.

DETAILED DESCRIPTION

Figure 1:
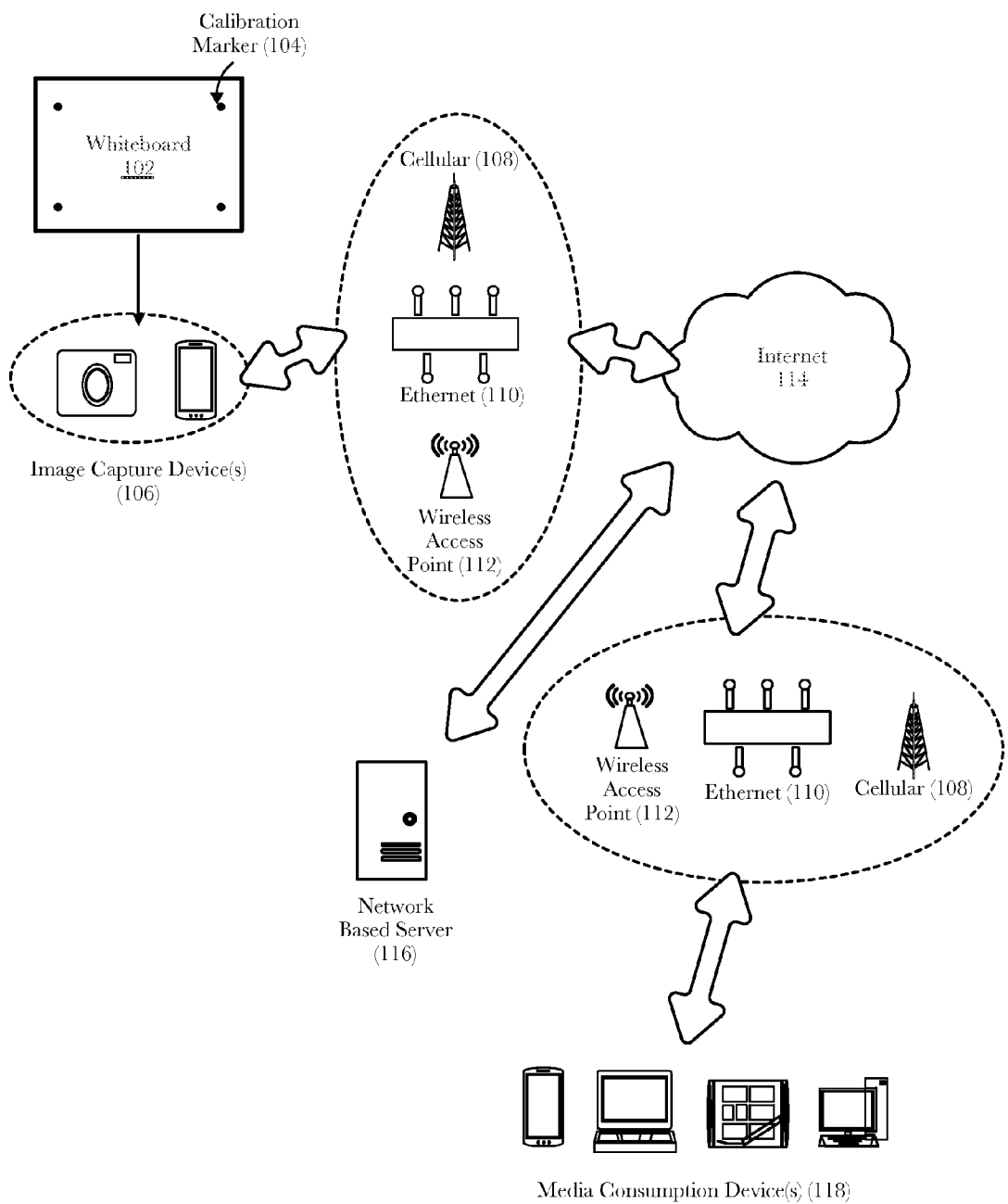
FIG. 1 illustrates an example block diagram for a networked environment according to an embodiment of the invention.

The embodiments described herein disclose systems and methods for capturing, processing, disseminating, and archiving image data associated with markings on whiteboards made during a collaborative meeting. The systems and methods of the invention may be embodied in and performed by image capture devices, communication devices, network based computer servers and other devices, and software instructions executed by some or all of such devices, as will be explained in detail below. The different types of networks contemplated herein include, for example, Internet Protocol (IP) based cellular data networks and IP based data networks, such as the Internet, wide area networks (WANs), local area networks (LANs), and combinations thereof including wireless (e.g., 802.11) and wireline (e.g., Ethernet).

As used herein the term "collaborative session" is meant to generally indicate a group of people that may be spread across multiple locations communicating together using audio and/or video communication systems.

The term "whiteboard" is used to indicate a surface capable of being written upon using chalk or markers of some kind wherein the whiteboard has no electrical connectivity with any other device. In its most general sense, a whiteboard is blank surface of any color that can accept markings from one of a variety of marking devices. For purposes of the embodiments described herein, the whiteboard may be marked with spots (or the like) that if connected typically form the perimeter of a rectangle with an area enclosed therein. Other shapes, perimeters, and areas besides a rectangle may be formed by imaginary lines connecting the spots.

The term "image capture device" is used to indicate a device capable of taking pictures that is also capable of transmitting the images of those pictures over a computer/communication network to a network based server located in a computer network. An image capture device 106 may include hardware and software that enable it to communicate over a variety of network interfaces including the one or more of a cellular IP data network, an Ethernet network, and an 802.11 WiFi network. An image capture device may include, but is not limited to, a camera enabled smartphone, a digital camera with network connectivity, a camera and network enabled tablet computer, and a camera and network enable personal computer.

The term "media consumption device" is used to indicate any device that includes network connectivity that allows it to communicate with a network based server containing images (or links to images) uploaded by an image capture device and processed by the network based server for purposes of, at a minimum, downloading and viewing images. A media consumption device may include hardware and software that enable it to communicate over a variety of network interfaces including the one or more of a cellular IP data network, an Ethernet network, and an 802.11 WiFi network. A media consumption device may include, but is not limited to, a smartphone, a network enabled tablet computer, a network enabled desktop or personal computer, and a network enabled display device such as, for instance, a smart television.

FIG. 1 illustrates an exemplary networked environment 100 for implementing certain exemplary embodiments described herein. The networked environment 100 may be split functionally into three (3) areas. First is image capture as represented by the whiteboard 102 and image capture devices 106. Second is image processing as represented by the network based server 116. Third is image retrieval as represented by the media consumption devices 118. A variety of networking equipment such as cellular towers 108, Ethernet switches/routers 110, and 802.11 WiFi wireless access points 112 may serve to connect the image capture devices 106 and media consumption devices 118 with the Internet 114. Since the network based server 116 is also connected to the Internet 114, the image capture devices 106 and media consumption devices 118 are communicable with the network based server 116. Both the image capture devices 106 and media consumption devices 118 may utilize any one of the network access options (cellular 108, Ethernet 110, or WiFi 112) depending on the devices connectivity options. Each of the network access options (cellular, Ethernet, or WiFi) is capable of exchanging IP data packets between the image capture devices 106 or media consumption devices 118 and the network based server 116.

In an example embodiment, a session with a network based server 116 may be initiated by an image capture device 106. Initiating a session may comprise sending a request to the network based server 116 identifying an image capture device 106 to be used for the session. The device initiating the session need not be the image capture device though it could be. All that is needed is a communication to the network based server 116 identifying the image capture device 106 so that a session ID token may be sent to the image capture device 106. The image capture device may then embed the session ID information into each image it uploads to the network based server 116. The network based server 116 may then associate the uploaded images with the appropriate session. The session ID along with any other descriptive information about the session may be stored by the network based server 116 and made available to any media consumption devices 118 that have been granted access to the network based server 116.

A whiteboard 102 may include calibration markers 104 that define a perimeter and area within which images, text and the like are considered relevant. An image capture device 106 may be oriented to include the four corners of the whiteboard 102 as calibration markers 104 within its field of view. The image capture device 106 may then snap a picture of the whiteboard 102 containing the relevant data (e.g., text, images, etc.). The picture along with the session ID and any other metadata may then be uploaded over any one of the aforementioned network connectivity mechanisms to the network based server 116. Pictures may be snapped on an as needed basis or may be snapped automatically on a periodic basis.

The network based server 116 receives each uploaded image and initially parses the metadata for a session ID. The image may then be stored in an area of memory reserved for that session ID. Image processing on the received image may also take place. Image processing may result in the creation of a snapshot. There may be two separate image processing steps designed to make consumption of an image optimized for a given media consumption device 118. A snapshot may be comprised of three images and metadata. The images may include: the originally uploaded image, a rasterized version of the originally uploaded image, and a vectorized version of the rasterized image. Thus, the two image processing steps performed are rasterization and vectorization—both of which are more fully described below. Once the processing steps have been completed, the snapshot has been created and the images are ready to be consumed by a media consumption device 118.

To retrieve or consume the images associated with a particular session ID, the network based server 116 may present as a web-page a list of URL hyperlinks containing session IDs and descriptions of the session. A media consumption device 118 may navigate to such a page and select the URL hyperlink of interest. Upon loading the page associated with the hyperlink, the media consumption device 118 may have on its display a series of thumbnail images associated with the session ID. The number of thumbnail images depends on the number of images uploaded to the network based server 116 with that particular session ID. Moreover, each thumbnail image may show the vectorized version of the image as it may be optimized for thumbnail viewing. However, the thumbnail image may be indicative of the snapshot meaning that the thumbnail image may also include access to the original image, the rasterized image, the vectorized image, and the metadata for that image. The user, via the media consumption device 118, may then select which image from the snapshot to download and display. In another embodiment, the downloaded image(s) may be stored locally on the media consumption device 118.

In certain embodiments, the cellular towers 108 are a part of cellular networks or portions of cellular networks that may be based on a variety of IP data protocols such as, but not limited to, Global System for Mobile Communications (GSM), Code Division Multiple Access (CDMA), General Packet Radio Service (GPRS), Enhanced Data for GSM Evolution (EDGE), Evolution-Data Optimized (EV-DO), High Speed Packet Data (HSPD), High Speed Downlink Packet Access (HSPDA), Long-Term Evolution (LTE), Voice-over Long-Term Evolution (VoLTE), Wideband Code Division Multiple Access (WCDMA), Universal Mobile Telecommunications System (UMTS), or High Rate Packet Data (HRPD) and/or any other cellular network standards.

Figure 2:
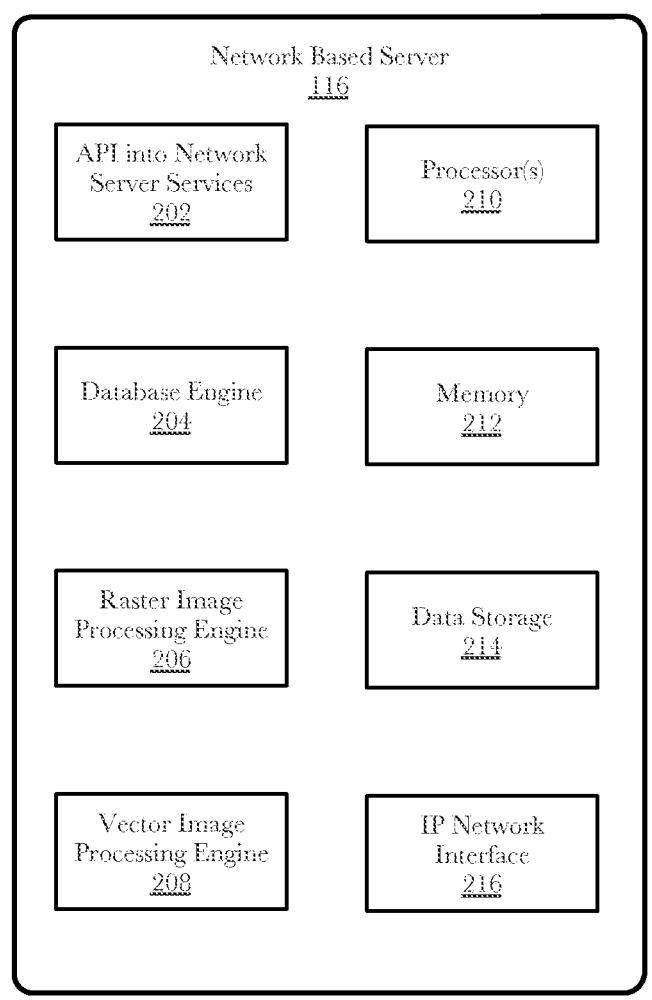
FIG. 2 illustrates an example of a computer server according to an embodiment of the invention.

FIG. 2 illustrates an example of a network based server 116 according to an embodiment of the invention. The network based server 116 may comprise one or more processors 210, a memory 212 storing operating system type software, data storage 214 for storing uploaded and processed images according to a file structure based, in part, on a session ID, a database engine 204 for interfacing with data storage 214, an application programming interface (API) for exchanging data between an image capture device 106 or a media consumption device 118 and the network based server 116, an IP network interface for communicating with other IP network devices, a raster image processing engine 206 for performing the rasterization processing on images, and a vector image processing engine 208 for performing the vectorization processing on rasterized images.

Included herein is a set of flow charts and message diagrams representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
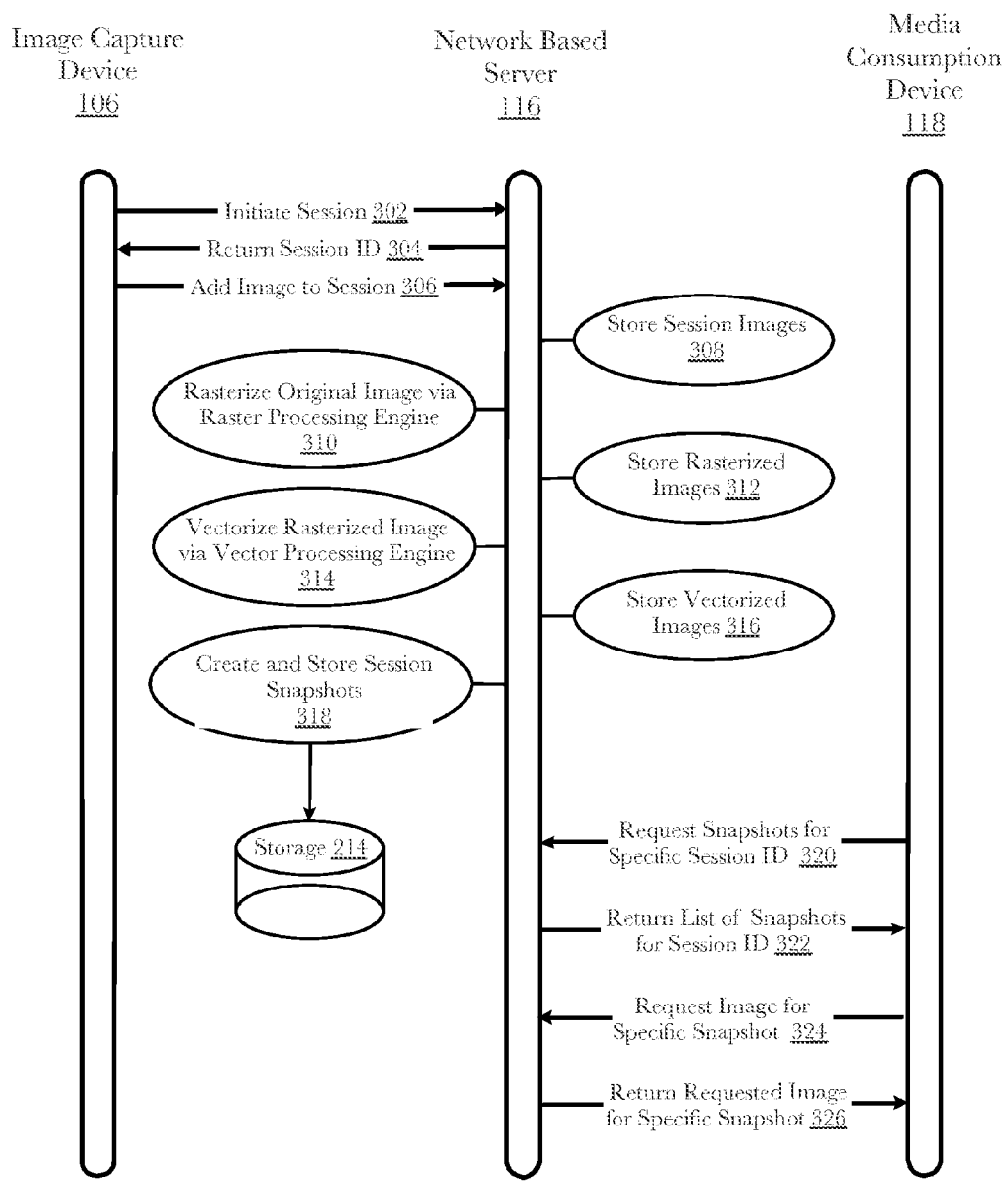
FIG. 3 illustrates an example messaging diagram according to an embodiment of the invention.

FIG. 3 illustrates an example messaging diagram 300 according to an embodiment of the invention. In this example, messages and processes occurring within, between, or among the image capture device 106, network based server 116, and media consumption device 118 as well as the processes occurring on the network based server 116 are shown. To begin, an image capture device 106 (or other networked computer device) establishes contact with the network based server 116 and sends an "initiate session" message 302. The network based server 116 receives and responds to the image capture device 106 with a session ID 304. The image capture device 106 may then begin snapping pictures (images) of the whiteboard 102 and tagging the metadata with the session ID. Each image may then be uploaded 306 to the network based server 116 where these original images may be stored 308 in a data storage component 214. The raster image processing engine 206 of network based server 116 may then process 310 an image to create a rasterized version of the image. This may include image normalization typically comprising lighting adjustments and perspective transformations using the calibration markers 104 of an image of the whiteboard 102. The rasterized version of the image is also stored 312. The rasterized version of the image adjusts the perspective of the original image capture device 106 angle, adjusts the lighting for elements like brightness and contrast, and crops out portions of the image not within calibration markers 104 of the whiteboard 102. The rasterized version of the image is then stored in data storage 214.

Following rasterization, the vector image processing engine 208 of network based server 116 may then process 314 an image to create a vectorized version of the image. This may include scaling the rasterized image to fit a multitude of displays having different screen sizes. The vectorized version of the image is also stored 316. The vectorized image is thus set up for media consumption devices 118 of different sizes and types (e.g., smartphones, tablets, laptop PCs, desktop PCs, televisions, etc.) where the image representation will be properly scaled for the consuming device. At this point, there are three (3) associated images the original uploaded image, the rasterized image, and the vectorized image. Each image and the associated metadata may then be organized into a snapshot.

A media consumption device 118 may then request snapshots 320 for a particular session ID. The network based server 116 may then return a list of snapshots 322 corresponding to the session ID. The media consumption device 118 may then request a specific image 324 from one of the snapshots to which the network based server 116 may reply by returning the actual image or a link to the actual image 326. The default requested and returned image for a board may be the vectorized image since it is scaled to display on the media consumption device 118.

In one embodiment, the 'list' of snapshots may also take the form of a series of URL type links such that when the media consumption device 118 selects or 'clicks on' a link, the associated image is retrieved and displayed on the media consumption device 118. The media consumption device 118 may also be able to save the image to local, external, or network accessible memory apart from the network based server 116.

In another embodiment, the 'list' of snapshots may also take the form of a series of thumbnail images for each session ID. Each thumbnail image may be encoded with a URL type location such that when the media consumption device 118 selects or 'clicks on' a thumbnail, the associated image is retrieved and displayed on the media consumption device 118. The media consumption device 118 may also be able to save the image to local, external, or network accessible memory apart from the network based server 116.

In another embodiment, the snapshots may be archived according to their session ID (and session ID descriptor) for future use and access. This feature addresses the "Do Not Erase" phenomenon that occurs when a whiteboard has been drawn upon in a meeting and the participants wish to preserve the information beyond the meeting.

Figure 4:
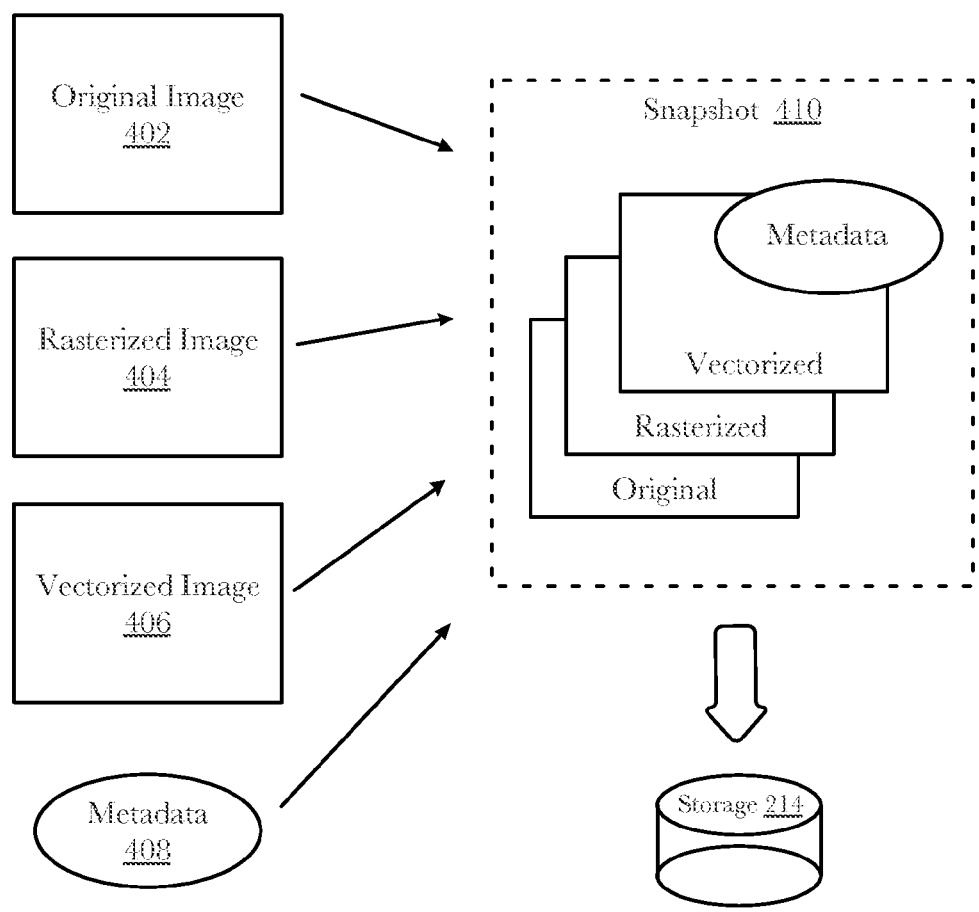
FIG. 4 illustrates an example of a snapshot according to an embodiment of the invention.

FIG. 4 illustrates an example of a snapshot 410 according to an embodiment of the invention. A snapshot 410 may be comprised of four separate components. These components include an originally uploaded image 402, a rasterized version 404 of the originally uploaded image 402, a vectorized version 406 of the rasterized version of the originally uploaded image 402, and metadata 408 for each of the images and the snapshot as a whole. For instance, the metadata 408 may include a board ID, the session ID and the session ID description (optional), a memory location (e.g., a URL link). The metadata 408 may further include file names for the original image 402, the rasterized image 404, and the vectorized image 406. The metadata 408 may also include the time and location (optional) where the original image 402, the rasterized image 404, and the vectorized image 406 were created, as well as a memory location (e.g., a URL link) for each image 402, 404, 406 associated with the snapshot 410. The snapshot 410 may be stored in data storage 214 and made accessible to authorized users searching for a valid session ID. There may be multiple board IDs associated with a single session ID.

FIG. 5A illustrates an example logic flow diagram 500 according to an embodiment of the invention. Logic flow 500 may be representative of some or all of the operations executed by one or more logic, features, or devices described herein, such as any devices, systems, methods and/or techniques described above with references to FIGS. 1-4 for example. More particularly, logic flow 500 may be implemented by the network based server 116 in some embodiments. In various embodiments, the logic flow 500 may be representative of some or all of the operations associated with receiving images from an image capture device 106, processing the received images to create rasterized and vectorized versions of the received images, associating a session and board ID with each of the processed images and storing the corresponding images under a common board ID. Each session ID may be associated with multiple board IDs. Other embodiments may be described and claimed.

The process may begin at block 502 when an image capture device 106 or a proxy device initiates a session with the network based server 116. The image capture device 106 (or proxy device) may log-in to the network based server 116. The network based server 116 may be a web-based server that presents a web page when accessed via a proxy device such as a computer. Or, the network based server 116 may be accessed by an application executing on the image capture device 106 in which case accessing the application may allow the user to select an option to initiate a session. For instance, the image capture device 106 may be a smartphone. The overall whiteboard imaging system may be comprised of a software application executing on the image capture devices 106 and media consumption devices 118. In some instances, an image capture device 106 and a media consumption device 118 may be one and the same. In such instances, a single software application may be configured to allow a user to select an imaging mode for uploading images to the network based server 116 and a consuming mode for retrieving specific images from the network based server 116. Additionally, the network based server 116 includes software for communicating with the image capture devices 106 and the media consumption devices 118. The network based server 116 may be configured to offer a cloud or network based service that receives, processes, and makes images available to media consumption devices 118.

At block 504, the network based server 116 may respond to the initiate session request by returning a session ID to the requesting image capture device 106. The session ID may then be embedded as metadata into data exchanges with the network based server 116. At block 506, the image capture device 106 may capture an image of a whiteboard 102. The whiteboard 102 may have been written upon by participants in a meeting. The whiteboard 102 may be pre-marked in each corner with a calibration marker 104 that may comprise circles, icons, or the like, the collection of these calibration markers 104 defining a perimeter and an area (e.g., a rectangle) within which relevant data may be captured.

At block 508, the image capture device 106 may upload the captured image to the network based server 116 including in the metadata, at a minimum, the session ID returned in block 504. At block 510, the network based server 116 may store the uploaded image and metadata in a data storage component 214. The uploaded image may be referred to as the original image and may be in one of a variety of known file formats. At block 512, the network based server 116 may initiate a rasterization process on the original image. The rasterization process may include perspective corrections configured to remove noise and smooth the image, find an edgemap, locate shapes and predict corners of those shapes, create a transformation matrix using the predicted corners, and perform a matrix multiplication on the original image to adjust the perspective. The rasterized version of the original image may then be stored as a new file such as, for instance, a compressed JPEG file.

At block 514, the rasterized version of the original image may undergo a vectorization process. The compressed rasterized JPEG file (or other file format) may be converted to an uncompressed bitmap image. The bitmap image may then be converted to a vector using, for instance, a polygon based tracing algorithm performing path decomposition, turn policies, despeckling, polygon generation and penalty assignments, and smoothing and corner analysis. The vectorization process may result in a scalable vector graphic file format that may be suitable for rendering on displays of different sizes.

It should be noted that the rasterization and vectorization processes described above are well known in the art and may be performed on a variety of image file formats including many not specifically described in the example above.

Figure 5B:
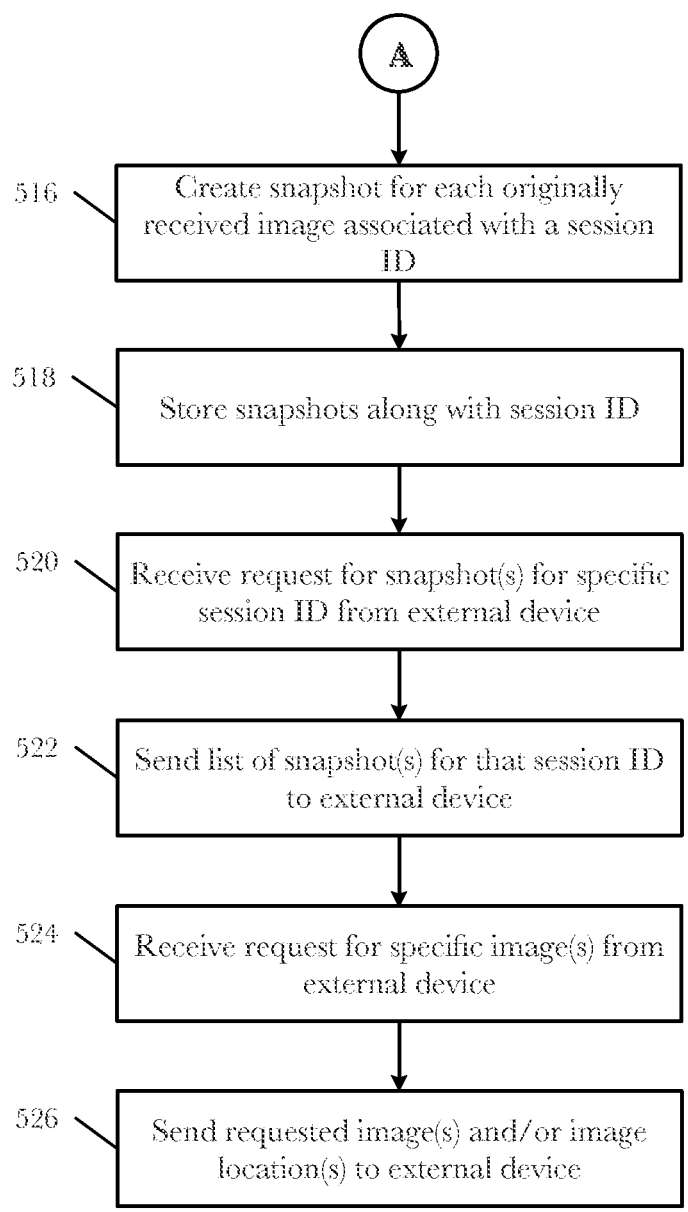
FIG. 5B is a continuation of the logic flow diagram of FIG. 5A according to an embodiment of the invention.

FIG. 5B is a continuation of the logic flow diagram 500 of FIG. 5A according to an embodiment of the invention. At block 514, the network based server 116 may create a snapshot for each image associated with a session ID. A snapshot may be comprised of the original uploaded image, the rasterized version of the original uploaded image, the vectorized version of the rasterized image, and the metadata associated with each of the images. The snapshot may then be stored at block 518 in data storage component 214.

Up to this point, images have been captured by image capture devices 106 and uploaded, processed and stored by the network based server 116. The remainder of the logic flow 500 addresses the network based server 116 providing access to the images to media consumption devices 118. At block 520, the network based server 116 may receive a request for a snapshot associated with a specific session ID. The request may take the form of selecting a session ID (and associated description) from a web based interface such as a web page from a media consumption device 118 such as a computer or a tablet. In another embodiment, the media consumption device may be a smartphone or a tablet running a specific application formatted for the smartphone or tablet. The application may present via a user interface a list of Session IDs with associated descriptors. For example, one element on the list may appear as "Session ID 1003: Weekly Sales Meeting (Jul. 31, 2015)". Other elements of the list may be similarly descriptive allowing a user to easily determine which session ID she is looking for. By clicking or selecting the link or icon for that session ID, a message or request is sent to the network based server 116 requesting access to the snapshots for that session ID.

At block 522, the network based server 116 may respond by sending a list of snapshots associated with the requested session ID. This may be accomplished by presenting on the web page (or via the application) another series of links or icons representing each snapshot for that session ID. For instance, the session ID may include six (6) snapshots. A link or icon for each one of the snapshots may be returned to the media consumption device 118 via a web page or application depending on the media consumption device 118. The snapshots themselves may be identifiable by a time stamp, a title, a file name and/or other metadata. At block 524, a user may request a specific image from one of the snapshots by selecting or clicking on the link or icon. Such an action may be considered a request to the network based server 116. As previously described, the snapshot may include the original image, the rasterized image, and the vectorized image. When making an image selection from a snapshot, the default image may be the vectorized image as it may be most suitable for rendering on a given display since it has undergone perspective processing and scaling. At block 526, the network based server 116 may provide a link to the requested image, may render the image directly on the media consumption device 118, and/or may download the image file to the media consumption device 118 for local rendering and storage.

The network based server 116 may permanently archive the snapshots associated with a session ID allowing future access to whiteboard 102 images long after the whiteboard itself has been erased. Moreover, the techniques described above do not require a whiteboard 102 to be specially constructed to include computer processor(s), memory, networking equipment, RF chips, etc. The techniques described herein take advantage of the ubiquity of smartphone cameras (or other image capture devices) and smartphone RF networking to provide images on demand to a cloud based network server 116. The network based server 116 is then responsible for cataloguing, processing and storing the images for instantaneous or future access on a variety of media consumption devices 118.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What is claimed is:

1. A method comprising:
   in a network based server situated in an Internet Protocol (IP) based packet data network:
   receiving a request for a session ID from an image capture requesting device via a networked connection;
   returning a session ID to the image capture requesting device;
   receiving original image data, the original image data indicative of a whiteboard, the whiteboard including calibration markers, the image data further comprising metadata, the metadata including the session ID;
   processing the received original image data, the processing including a rasterization process resulting in rasterized image data and a vectorization process on the rasterized image data resulting in vectorized image data;
   creating a snapshot comprising the received image data, the rasterized image data, the vectorized image data, and the metadata;
   storing the snapshot;
   receiving an access request for a snapshot associated with a session ID from a media consumption requesting device via a networked connection; and
   providing access to the snapshot corresponding to the session ID to the media consumption requesting device.

2. The method of claim 1, the rasterization process comprising:
   removing noise within the original image data;
   smoothing the original image data;
   finding an edgemap within the original image data;
   locating the calibration markers of the original image data via corner prediction;
   creating a transformation matrix using the calibration markers; and
   performing a matrix multiplication on the original image to adjust the perspective of the original image data.

3. The method of claim 2, the vectorization process comprising:
   converting the rasterized image data to uncompressed bitmap image data;
   converting the bitmap image data to vectorized image data by:
   performing path decomposition, turn policies, despeckling, polygon generation and penalty assignments, and smoothing and corner analysis resulting in scalable vector graphic image data.

4. The method of claim 1, the networked connection comprising one of an 802.11 WiFi network connection, a cellular network connection, an 802.16 WiMax network connection, a wireless network connection operating within a frequency range of 100 MHz and 700 MHz, and a wireless network connection operating within a frequency range of 3.5 GHz and 3.7 GHz.

5. The method of claim 2, the cellular networked connection utilizing an IP protocol based on one of a General Packet Radio Service (GPRS), Enhanced Data for GSM Evolution (EDGE), Evolution-Data Optimized (EV-DO), High Speed Packet Data (HSPD), High Speed Downlink Packet Access (HSPDA), Long-Term Evolution (LTE), Voice-over Long-Term Evolution (VoLTE), Wideband Code Division Multiple Access (WCDMA), Universal Mobile Telecommunications System (UMTS), or High Rate Packet Data (HRPD).

6. A network based server situated in an Internet Protocol (IP) based packet data network, comprising:
   a memory unit for storing code;
   at least one processor for executing the stored code to:
   receive a request for a session ID from an image capture requesting device via a networked connection;
   return a session ID to the image capture requesting device;
   receive original image data, the original image data indicative of a whiteboard, the whiteboard including calibration markers, the image data further comprising metadata, the metadata including the session ID;
   process the received original image data, the processing including a rasterization process resulting in rasterized image data and a vectorization process on the rasterized image data resulting in vectorized image data;
   create a snapshot comprising the received image data, the rasterized image data, the vectorized image data, and the metadata;
   store the snapshot;
   receive an access request for a snapshot associated with a session ID from a media consumption requesting device via a networked connection; and
   provide access to the snapshot corresponding to the session ID to the media consumption requesting device.

7. The network based server of claim 6, the rasterization process comprising:
   removing noise within the original image data;
   smoothing the original image data;
   finding an edgemap within the original image data;
   locating the calibration markers of the original image data via corner prediction;
   creating a transformation matrix using the calibration markers; and
   performing a matrix multiplication on the original image to adjust the perspective of the original image data.

8. The network based server of claim 7, the vectorization process comprising:
   converting the rasterized image data to uncompressed bitmap image data;
   converting the bitmap image data to vectorized image data by:
   performing path decomposition, turn policies, despeckling, polygon generation and penalty assignments, and smoothing and corner analysis resulting in scalable vector graphic image data.

9. The network based server of claim 6, the networked connection comprising one of an 802.11 WiFi network connection, a cellular network connection, an 802.16 WiMax network connection, a wireless network connection operating within a frequency range of 100 MHz and 700

MHz, and a wireless network connection operating within a frequency range of 3.5 GHz and 3.7 GHz.

10. The network based server of claim 9, the cellular networked connection utilizing an IP protocol based on one of a General Packet Radio Service (GPRS), Enhanced Data for GSM Evolution (EDGE), Evolution-Data Optimized (EV-DO), High Speed Packet Data (HSPD), High Speed Downlink Packet Access (HSPDA), Long-Term Evolution (LTE), Voice-over Long-Term Evolution (VoLTE), Wideband Code Division Multiple Access (WCDMA), Universal Mobile Telecommunications System (UMTS), or High Rate Packet Data (HRPD).

11. At least one non-transitory machine-readable medium comprising a set of instructions that in response to being executed on a computing device cause the computing device to:
receive a request for a session ID from an image capture requesting device via a networked connection;
return a session ID to the image capture requesting device;
receive original image data, the original image data indicative of a whiteboard, the whiteboard including calibration markers, the image data further comprising metadata, the metadata including the session ID;
process the received original image data, the processing including a rasterization process resulting in rasterized image data and a vectorization process on the rasterized image data resulting in vectorized image data;
create a snapshot comprising the received image data, the rasterized image data, the vectorized image data, and the metadata;
store the snapshot;
receive an access request for a snapshot associated with a session ID from a media consumption requesting device via a networked connection; and
provide access to the snapshot corresponding to the session ID to the media consumption requesting device.

12. The at least one non-transitory machine-readable medium of claim 11, wherein the rasterization process comprises instructions that in response to being executed on the computing device cause the computing device to:
remove noise within the original image data;
smooth the original image data;
find an edgemap within the original image data;
locate the calibration markers of the original image data via corner prediction;
create a transformation matrix using the calibration markers; and
perform a matrix multiplication on the original image to adjust the perspective of the original image data.

13. The at least one non-transitory machine-readable medium of claim 11, wherein the vectorization process comprises instructions that in response to being executed on the computing device cause the computing device to:
convert the rasterized image data to uncompressed bitmap image data;
convert the bitmap image data to vectorized image data by:
performing path decomposition, turn policies, despeckling, polygon generation and penalty assignments, and smoothing and corner analysis resulting in scalable vector graphic image data.

14. The at least one non-transitory machine-readable medium of claim 11, wherein the networked connection comprises one of an 802.11 WiFi network connection, a cellular network connection, an 802.16 WiMax network connection, a wireless network connection operating within a frequency range of 100 MHz and 700 MHz, and a wireless network connection operating within a frequency range of 3.5 GHz and 3.7 GHz.

15. The at least one non-transitory machine-readable medium of claim 14, wherein the cellular networked connection utilizes an IP protocol based on one of a General Packet Radio Service (GPRS), Enhanced Data for GSM Evolution (EDGE), Evolution-Data Optimized (EV-DO), High Speed Packet Data (HSPD), High Speed Downlink Packet Access (HSPDA), Long-Term Evolution (LTE), Voice-over Long-Term Evolution (VoLTE), Wideband Code Division Multiple Access (WCDMA), Universal Mobile Telecommunications System (UMTS), or High Rate Packet Data (HRPD).

* * * * *